United States Patent

Yoshida et al.

[11] Patent Number: 5,222,408
[45] Date of Patent: Jun. 29, 1993

[54] WORM GEAR STRUCTURE AND METHOD OF MAKING SAME

[75] Inventors: Masao Yoshida; Junichi Kato; Tetsuya Sunaga, all of Gunma, Japan

[73] Assignee: Mitsuba Electric Manufacturing Co., Ltd., Gunma, Japan

[21] Appl. No.: 895,664

[22] Filed: Jun. 9, 1992

[30] Foreign Application Priority Data

Jun. 21, 1991 [JP] Japan .................. 3-177332

[51] Int. Cl.⁵ .............................. F16H 55/17
[52] U.S. Cl. ........................... 74/458; 74/425
[58] Field of Search ................... 74/425, 458

[56] References Cited

U.S. PATENT DOCUMENTS

| | | | |
|---|---|---|---|
| 1,514,491 | 11/1924 | Wildhaber | 74/458 |
| 2,619,845 | 12/1952 | Mackmann et al. | 74/458 |
| 2,959,977 | 11/1960 | Franke | 74/458 |
| 4,047,449 | 9/1977 | Popov | 74/458 |
| 4,739,671 | 4/1988 | Nelson | 74/458 X |

FOREIGN PATENT DOCUMENTS 60-95257 6/1985 Japan .

OTHER PUBLICATIONS

Deutschman, et al., "Machine Design; theory and practice," MacMillan Publishing Co., Inc., 1975, pp. 601, 623–626, and 633–637.
"Spiral and Worm Gearing," The Industrial Press, The Machinery Publishing Co., Ltd., 1914, pp. 156–169.

Primary Examiner—Allan D. Herrmann
Assistant Examiner—David W. Laub
Attorney, Agent, or Firm—Oliff & Berridge

[57] ABSTRACT

A balanced worm gear attachable to an output shaft of a motor so as not to disturb the balance of the output shaft. The overall length of the worm gear is set to be an integral multiple of a predetermined pitch L of the worm tooth. The formed worm gear has symmetrical ends which can further be more closely balanced by chamfering the ends.

4 Claims, 2 Drawing Sheets

WORM GEAR STRUCTURE AND METHOD OF MAKING SAME

BACKGROUND OF THE INVENTION

1. Field of the Invention

The present invention relates to the structure of a worm gear integrally attached to an output shaft of a motor.

2. Description of the Related Art

At present, when worm gears are attached to output shafts, either the output shafts have worm gears cut directly into them or worm gears separate from the output shafts are attached by pressure to the output shafts so as to be integral with the output shafts. Because of a strong demand in recent years for compact and lightweight worm gears, various attempts have been made to employ a type of worm gear integrally attached to the output shaft. The reason for this is that the diameter of this output shaft can be reduced. Such a worm gear is disclosed in, for example, Japanese Patent Laid-Open Publication No. 60-95257. The relationship between the length of the worm gear and the pitch of a worm tooth has not hitherto been examined. The length of the worm gear is arbitrarily set, and the worm gear is cut in accordance with this length, and used as it is. For this reason, the shape of one end of the worm gear where it is cut differs from the shape of the other end where it is cut. When the worm gear is directly attached to the output shaft, the output shaft is no longer balanced, thus causing the problem of unsmooth rotation of the output shaft.

SUMMARY OF THE INVENTION

The object of the present invention is to provide a worm gear structure which solves the above problem. This invention provides a worm gear integrally attached to an output shaft of a motor, wherein the overall length of the worm gear is set so as to be an integral multiple of one pitch of a worm tooth, and then is cut on both ends of the worm gear, which ends are then chamfered.

Because of the structure of this invention described above, when the worm gear is attached to the output shaft of the motor, the balance of the output shaft is not disturbed.

BRIEF DESCRIPTION OF THE DRAWINGS

The invention will be described in detail with reference to the following drawings wherein.

DESCRIPTION OF THE PREFERRED EMBODIMENT

Figure 1:
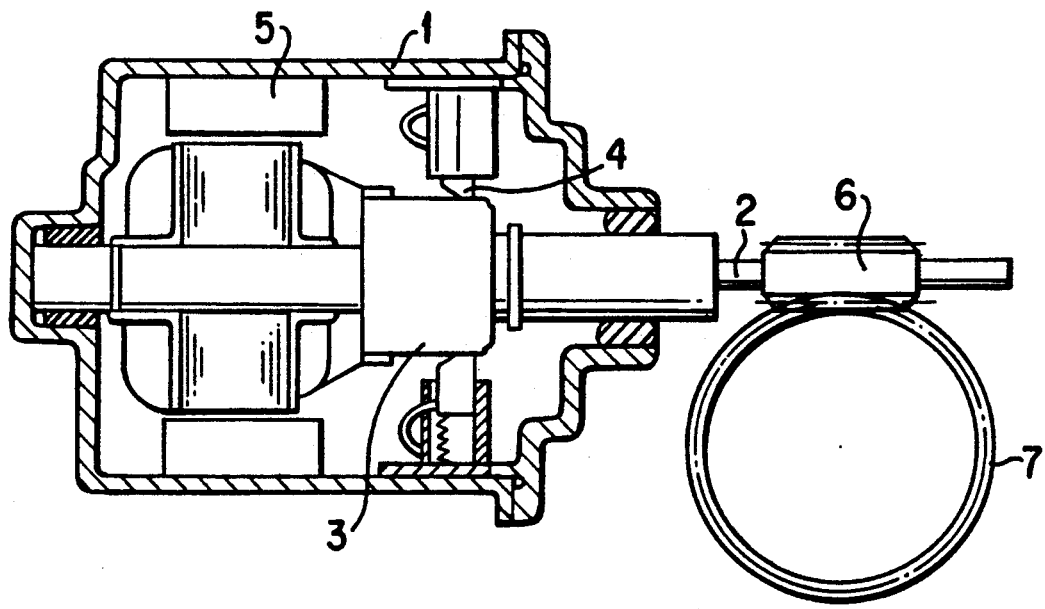
FIG. 1 is a sectional view of a motor.
Figure 2:
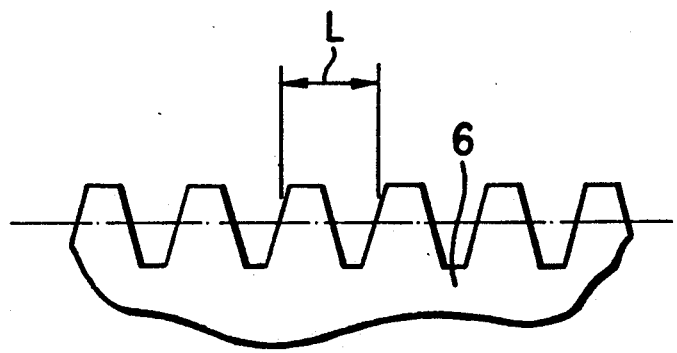
FIG. 2 is a partially enlarged view showing a worm gear.

The preferred embodiment of the present invention will now be described with reference to the accompanying drawings. Referring to the drawings, numeral 1 denotes the yoke of a motor; 2, the output shaft of the motor; 3, a commutator; 4, a brush; and 5, a permanent magnet. An electric motor is constructed using these components in the same manner as in the conventional art. A worm gear 6 to which this invention is applied is attached by pressure to the output shaft 2 of the motor to form an integral structure. A worm wheel 7 is engaged with the worm gear 6 to transmit the power of the electric motor.

Figure 3A:
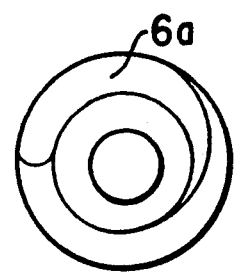
FIG. 3(A) is an end view showing the shape of one end of the worm gear where it is out.
Figure 3B:
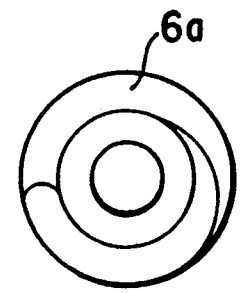
FIG. 3(B) is an end view showing the shape of the other end where it is cut.
Figure 4:
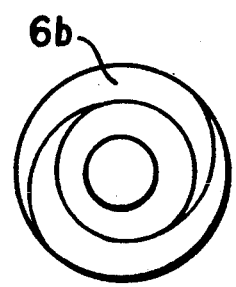
FIG. 4 is an end view showing one chamfered end of the worm gear.

The worm gear 6 has a pitch L. The whole length of the worm gear 6 or the whole length of the threaded portion is set so as to be an integral multiple of the pitch L. Then, both ends of the worm gear 6 are cut. As shown in FIGS. 3(A) and 3(B), the shape of one end 6a of the worm gear 6 where it is cut is symmetrical to the shape of the other end 6a. These cut areas are thus uniformly formed and then chamfered as indicated by 6b shown in FIG. 4.

In the thus-constructed embodiment of this invention, the worm gear 6 is integrally attached by pressure to the output shaft 2 of the motor. The whole length of the worm gear 6 is set so as to be an integral multiple of the pitch L. Because of such setting, the cut areas at both ends of the worm gear are symmetrical with each other and are uniformly formed and then chamfered. As a result, both chamfered ends of the worm gear 6 are maintained in a symmetrical state. The balance of the output shaft 2 is maintained to a high degree. Even when the worm gear 6 is attached to the output shaft 2 of the motor, the balance of the output shaft 2 is not disturbed, thus making it possible for the output shaft 2 to rotate smoothly.

This invention is constructed as described above. The whole length of the worm gear integrally attached by pressure to the shaft of the motor is set so as to be an integral multiple of the pitch. The cut areas at both ends of the worm gear are symmetrical with each other and are uniformly formed and then chamfered. As a result, both chamfered ends of the worm gear are maintained in a symmetrical state. The balance of the output shaft is maintained to a high degree. Even when the worm gear is attached to the output shaft of the motor, the balance of the output shaft is not disturbed, thus making it possible for the output shaft to rotate smoothly.

I claim:

1. A balanced worm gear for attachment to an output shaft of a motor, the worm gear having a predetermined pitch and a longitudinal length equal to an integral multiple of said predetermined pitch, said worm gear having symmetrical ends, said worm gear being balanced during rotation about a longitudinal axis of the output shaft.

2. The balanced worm gear of claim 1, wherein said symmetrical ends are chamfered.

3. A method of forming a balanced worm gear of a motor having a worm gear mounted on an output shaft, the method comprising the steps of:
   (1) determining a pitch for said worm gear;
   (2) forming said worm gear with an overall length equal to an integral multiple of said pitch;
   (3) forming both ends of said worm gear symmetrically; and
   (4) integrally attaching said worm gear to said output shaft without disturbing a balance of the output shaft about a longitudinal axis of the output shaft.

4. The method of claim 3, further comprising the step of:
   chamfering said symmetrical ends of said balanced worm gear.

* * * * *